Sept. 13, 1927.  J. TRACY  1,642,095

FLUID DYNAMOMETER

Filed Nov. 28, 1925    2 Sheets-Sheet 1

INVENTOR
JOSEPH TRACY
BY H. H. Dyke
ATTORNEY

Sept. 13, 1927.

J. TRACY 1,642,095

FLUID DYNAMOMETER

Filed Nov. 28, 1925

2 Sheets-Sheet 2

INVENTOR
JOSEPH TRACY
BY H. H. Dyke
ATTORNEY

Patented Sept. 13, 1927.

1,642,095

UNITED STATES PATENT OFFICE.

JOSEPH TRACY, OF RUTHERFORD, NEW JERSEY.

FLUID DYNAMOMETER.

Application filed November 28, 1925. Serial No. 71,900.

My invention is of a fluid dynamometer.

The fluid brake made use of in accordance with my invention is a positive rotary pump, preferably a rotary gear pump.

A positively operated gear pump, provided with means, as a valve, for controlling the size of the outlet aperture is well adapted for converting energy applied to operate the pump into kinetic energy of a moving stream of fluid having a velocity dependent principally on the power applied and the size of outlet aperture. Velocity energy of the outgoing stream of fluid can be converted into heat energy by checking the velocity of the discharged fluid stream, and the heat readily dissipated, and the fluid reused, if desired. By making use of such a pump as a fluid brake, an inexpensive and compact apparatus may be used for making dynamometer tests of power devices of a wide range of power producing capacity and from practically zero speed up to very high speeds of rotation.

Furthermore, such pumps are reversible in a double sense, that is to say, they operate equally well when run either clockwise or counter-clockwise, and the pump can be used as a motor instead of for pumping.

Availability for operation as a pump in either direction of rotation is of advantage in a dynamometer in that the instrument is suited for testing either motor vehicle engines or marine engines, for example, the capacity for operation as a motor is also of advantage, as, for example, in making determinations of friction, etc., losses of various machines being tested, and in starting up, when making dynamometer tests of machines, such as internal combustion engines.

Figure 1:
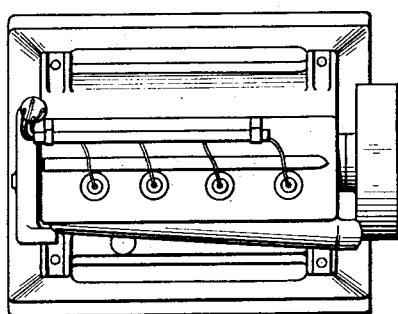
Figure 1:
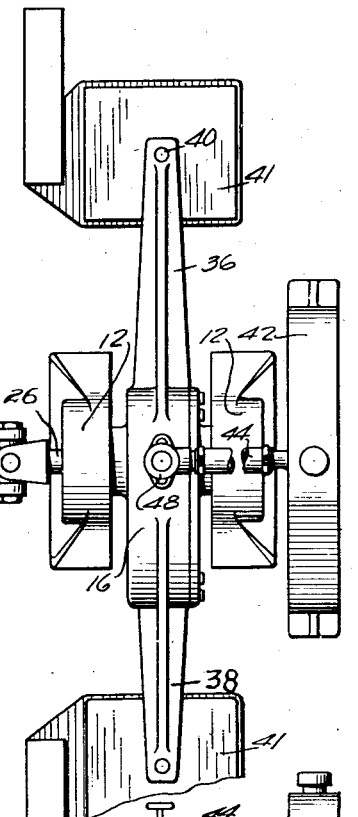
Figure 2:
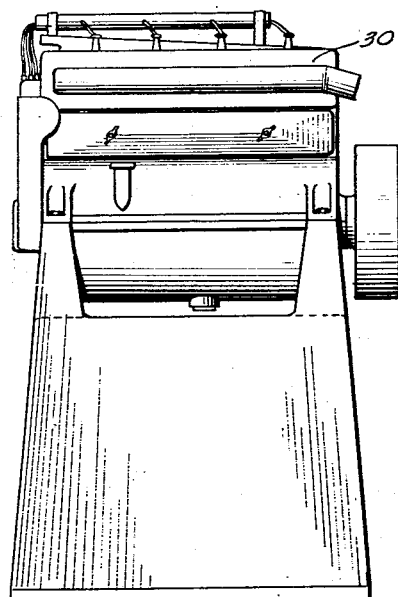
Figure 2:
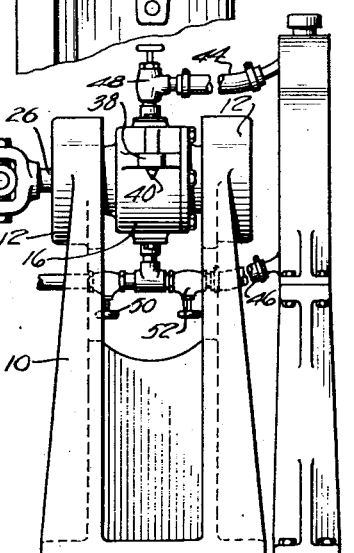
Figure 3:
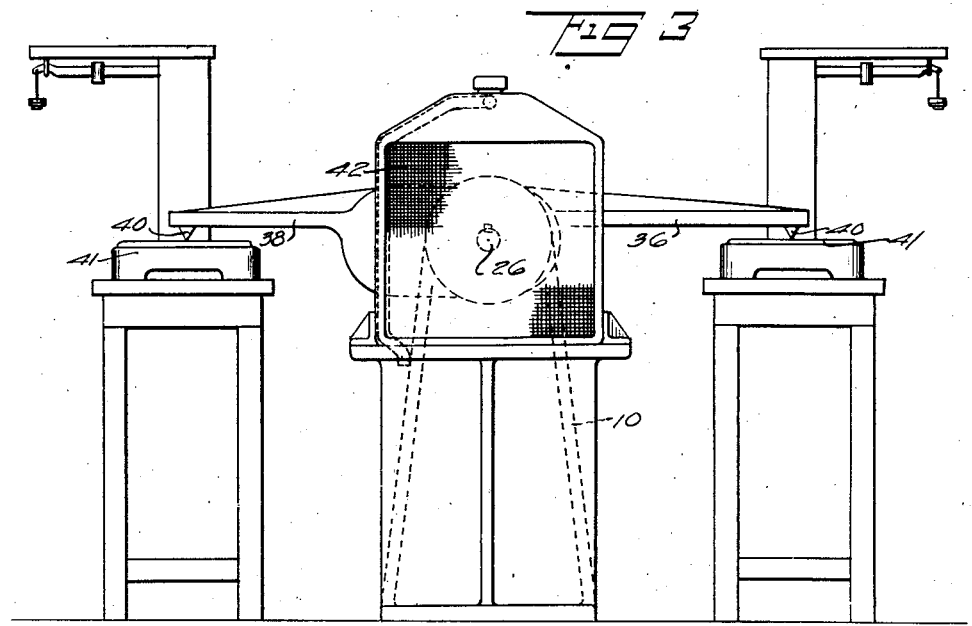
Figure 4:
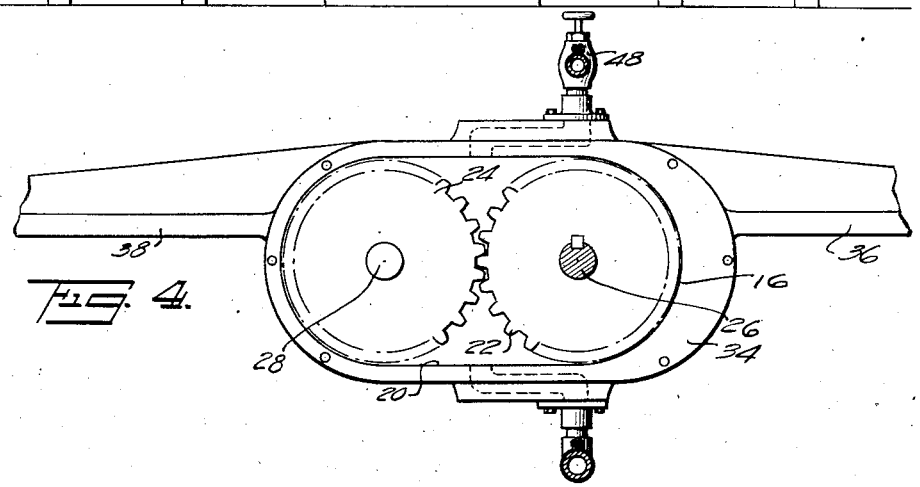
Figure 5:
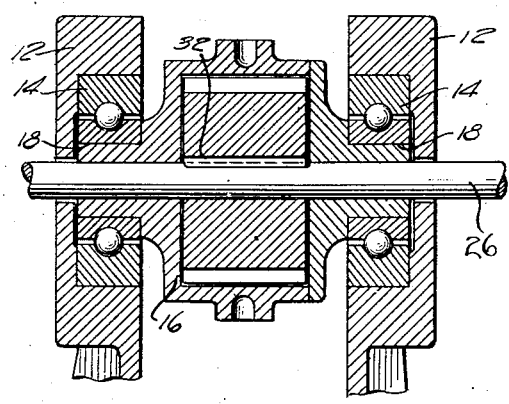

For the purpose of affording an understanding of the invention I have shown an embodiment thereof in the accompanying drawings, in which Fig. 1 is a plan view, Fig. 2 is a side view, and Fig. 3 is an end view of a fluid dynamometer. Fig. 4 is a detail section of a rotary gear pump, and Fig. 5 is a transverse section.

Reference character 10 indicates the dynamometer stand, which is provided with housings 12 for the ball bearings 14. The pump casing 16 is provided with trunnions 18 mounted on the ball bearings 14 to turn freely on an axis coincident with the axis of the driving gear of the pump.

The casing 16 contains an elongated gear chamber 20. The driving pump gear 22 and the idler gear 24, which mesh with one another, fit closely within the chamber 20, being mounted on shafts 26 and 28. The drive shaft 26 of gear 22 is made coaxial with the bearing for the pump casing by being mounted in the axis of trunnions 18, and may extend out beyond the casing 16 at one or both of its ends for connecting to an engine 30 or the like for testing. Driving gear 22 turns with shaft 26. A key 32 connecting these parts is shown in Fig. 5. Idler gear 24 turns freely on the fixed shaft or pin 28.

The casing 16 is preferably balanced by means of extra metal at 34.

Pump casing 16 is provided with arms 36, 38 equipped with pointed studs or knife edges 40 for exerting pressure on a scale 41. Scale 41 may be moved to coact with arm 38 or may be located under arm 36, as shown. The illustrated arrangement of scale 41 is adapted for making dynamometer tests of an engine which runs counter-clockwise, or for motoring an engine which runs clockwise.

The fluid used for testing may be run to waste; but usually it is circulated and, when this is done, means are provided for cooling the fluid passing through the apparatus, which becomes heated by converting the mechanical energy into heat energy. A cooler 42 is indicated in the drawings. The cooler should have ample capacity for free flow of fluid therethrough, and may take many forms.

Where the cooler 42 is fixedly supported separately from the pump casing, as here shown, connections are made by means of comparatively long and flexible hose connections 44, 46, so as not to interfere with the free turning of casing 16 and the obtaining of correct torque readings.

Valves and piping are provided to secure the necessary control. When operated with water the piping and valves may be as shown in the drawing, in which the extent of opening of the pump outlet is controlled by valve 48 mounted on the pump adjacent to its outlet. Valve 50 controls the supply of water under pressure and valve 52 serves for cutting off the return connection from the cooler when the pump is run as a motor, the surplus water running to waste, as by overflow from the cooler. Valving and piping of various other forms than as shown may be readily arranged to provide for power control, reversals, etc., as will be readily understood.

Instead of water, other fluids may be made use of, as, for example, oil is best adapted for heavy testing work, and for very high speed tests of power units, such as steam turbines and the like, I pump gaseous fluids, such as air, through a positive rotary pump, which for purposes of pumping gaseous fluids is preferably of the type known as a Root's blower.

In making dynamometer tests practically complete control can be obtained by adjustment of the outlet valve 48, return valve 52 being wide open and valve 50 closed, except when the pump is used as a motor, at which time valve 52 is closed and valves 48 and 50 are open.

By opening valve 48 wide the fluid will circulate freely, except for friction and mechanical loss. This is of special advantage in dynamometers used for testing internal combustion engines which can idle freely with valve 48 open, picking up a load only as the valve 48 is adjusted towards its closed position.

The apparatus shown is presented for the purpose of affording an understanding of the invention and its principle of operation. Modifications may be resorted to within the scope of my claims.

I claim:

1. A fluid dynamometer comprising a fluid brake consisting of a rotary gear pump, a valved outlet conduit therefrom, a cooler, and a return conduit from the cooler to the pump.

2. A combined dynamometer and motor, comprising a rotary gear pump and means of fluid connection thereto, whereby the pump can be operated as a fluid brake or as a motor.

3. In a fluid dynamometer, a fluid brake consisting of a rotary gear pump mounted to pivot on an axis, a cooler, a conduit from the pump outlet to the cooler, valve means for controlling the extent of opening of said conduit, a return conduit from the cooler to the pump inlet, and means for measuring the turning moment of said brake.

4. In a fluid dynamometer, a fluid brake consisting of a rotary gear pump mounted to pivot on an axis coincident with the axis of the pump driving gear, a cooler, a conduit from the pump outlet to the cooler, valve means for controlling the extent of opening of said conduit, a return conduit from the cooler to the pump inlet, and means for measuring the turning moment of said brake.

5. In a fluid dynamometer, a fluid brake consisting of a rotary gear pump mounted to pivot on an axis coincident with the axis of the pump driving gear, a cooler, a substantially fixed support for said cooler, a flexible conduit from the pump outlet to the cooler, valve means adjacent to the pump outlet for controlling the extent of opening of said conduit, a flexible return conduit from the cooler to the pump inlet, and means associated with said fluid brake for measuring its turning moment.

6. In the process of measuring torque applied to turn a mechanism, the step which includes operating a positive rotary pump as a motor and connecting same to turn the mechanism.

In testimony whereof, I have signed my name hereto.

JOSEPH TRACY.